(12) United States Patent
Kushwah et al.

(10) Patent No.: US 10,635,548 B2
(45) Date of Patent: Apr. 28, 2020

(54) DATA BLOCK NAME BASED EFFICIENT RESTORE OF MULTIPLE FILES FROM DEDUPLICATED STORAGE

(71) Applicant: NetApp, Inc., Sunnyvale, CA (US)

(72) Inventors: Ajay Pratap Singh Kushwah, San Ramon, CA (US); Ling Zheng, Saratoga, CA (US); Sharad Jain, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 287 days.

(21) Appl. No.: 15/795,551

(22) Filed: Oct. 27, 2017

(65) Prior Publication Data

US 2019/0129810 A1      May 2, 2019

(51) Int. Cl.
*G06F 16/17* (2019.01)
*G06F 11/14* (2006.01)
*G06F 16/11* (2019.01)
*G06F 16/174* (2019.01)

(52) U.S. Cl.
CPC ...... *G06F 11/1469* (2013.01); *G06F 11/1453* (2013.01); *G06F 16/125* (2019.01); *G06F 16/1748* (2019.01); *G06F 2201/80* (2013.01); *G06F 2201/805* (2013.01); *G06F 2201/82* (2013.01); *G06F 2201/84* (2013.01)

(58) Field of Classification Search
CPC . G06F 11/1469; G06F 16/125; G06F 16/1748
See application file for complete search history.

(56) References Cited

U.S. PATENT DOCUMENTS

| | | |
|---|---|---|
| 7,694,191 B1 | 4/2010 | Bono et al. |
| 8,285,758 B1 | 10/2012 | Bono et al. |
| 8,504,529 B1 | 8/2013 | Zheng et al. |
| 8,620,973 B1 | 12/2013 | Veeraswamy et al. |

(Continued)

FOREIGN PATENT DOCUMENTS

| | | |
|---|---|---|
| EP | 3477482 A2 | 5/2019 |
| WO | 2009019128 A1 | 2/2009 |

OTHER PUBLICATIONS

USENIX Association Berkeley, CA, Jun. 13, 2012, 12 pages, retrieved on Sep. 6, 2016 fromhttps://www.usenix.org/system/files/conference/atc12/atc12-final43.pdf.

(Continued)

*Primary Examiner* — Loc Tran
(74) *Attorney, Agent, or Firm* — Pepper Hamilton LLP

(57) ABSTRACT

A storage appliance can be designed to facilitate efficient restore of multiple backed up files in a system that allows files to share data blocks. A data management application or storage OS names data blocks and communicates those names to the storage appliance when backing up to or through the storage appliance. The storage appliance can leverage the data block names when restoring a group of files by restoring at data block granularity instead of file granularity. Restoring at the granularity of the data blocks by their names allows the storage appliance to avoid repeatedly sending a same data block to the restore requestor (e.g., a storage OS or data management application) while still instructing the restore requestor how to reconstruct the corresponding file(s) with mappings between valid data ranges and the named data blocks.

18 Claims, 4 Drawing Sheets

(56) References Cited

U.S. PATENT DOCUMENTS

| | | | |
|---|---|---|---|
| 9,020,903 B1 | 4/2015 | Vempati et al. | |
| 9,679,040 B1 | 6/2017 | Davis et al. | |
| 9,720,835 B1 | 8/2017 | Shilane et al. | |
| 2005/0066095 A1 | 3/2005 | Mullick et al. | |
| 2007/0266056 A1 | 11/2007 | Stacey et al. | |
| 2012/0084261 A1 | 4/2012 | Parab | |
| 2012/0159016 A1* | 6/2012 | Morita | G06F 13/1673 710/33 |
| 2013/0110778 A1* | 5/2013 | Taylor | G06F 11/1435 707/624 |
| 2015/0261792 A1 | 9/2015 | Attarde et al. | |
| 2016/0188415 A1 | 6/2016 | Karinta et al. | |
| 2016/0231940 A1 | 8/2016 | Tabachnik et al. | |
| 2017/0123935 A1 | 5/2017 | Pandit et al. | |
| 2017/0212811 A1 | 7/2017 | Kashnikov et al. | |

OTHER PUBLICATIONS

International Search Report and Written Opinion for Application No. PCT/US2017/059079 dated Feb. 5, 2018, 15 pages.
International Search Report and Written Opinion for Application No. PCT/US2017/059090 dated Feb. 2, 2018, 12 pages.
Extended European Search Report for Application No. EP18203066 dated Jul. 19, 2019, 9 pages.
Extended European Search Report for Application No. EP20180203064 dated Feb. 24, 2020, 8 pages.

\* cited by examiner

DATA BLOCK NAME BASED EFFICIENT RESTORE OF MULTIPLE FILES FROM DEDUPLICATED STORAGE

BACKGROUND

The disclosure generally relates to the field of data processing, and more particularly to database and file management or data structures.

An organization can specify a data management strategy in a policy(ies) that involves data recovery and/or data retention. For data recovery, an application or program creates a backup and restores the backup when needed. The Storage Networking Industry Association (SNIA) defines a backup as a "collection of data stored on (usually removable) non-volatile storage media for purposes of recovery in case the original copy of data is lost or becomes inaccessible; also called a backup copy." For data retention, an application or program creates an archive. SNIA defines an archive as "A collection of data objects, perhaps with associated metadata, in a storage system whose primary purpose is the long-term preservation and retention of that data." Although creating an archive may involve additional operations (e.g., indexing to facilitate searching, compressing, encrypting, etc.) and a backup can be writable while an archive may not be, the creation of both involves copying data from a source to a destination.

This copying to create a backup or an archive can be done differently. All of a defined set of data objects can be copied, regardless of whether they have been modified since the last backup to create a "full backup." Backups can also be incremental. A system can limit copying to modified objects to create incremental backups, either a cumulative incremental backup or a differential incremental backup. SNIA defines a differential incremental backup as "a backup in which data objects modified since the last full backup or incremental backup are copied." SNIA defines a cumulative incremental backup as a "backup in which all data objects modified since the last full backup are copied."

A data management/protection strategy can use "snapshots," which adds a point in time aspect to a backup. A more specific definition of a snapshot is a "fully usable copy of a defined collection of data that contains an image of the data as it appeared at a single instant in time." In other words, a snapshot can be considered a backup at a particular time instant. Thus, the different techniques for creating a backup can include different techniques for creating a snapshot. The SNIA definition further elaborates that a snapshot is "considered to have logically occurred at that point in time, but implementations may perform part or all of the copy at other times (e.g., via database log replay or rollback) as long as the result is a consistent copy of the data as it appeared at that point in time. Implementations may restrict point in time copies to be read-only or may permit subsequent writes to the copy."

An organization can use different backup strategies. A few backup strategies include a "periodic full" backup strategy and a "forever incremental" backup strategy. With the periodic full backup strategy, a backup application creates a full snapshot ("baseline snapshot") periodically and creates incremental snapshots between the periodically created full snapshots. With the forever incremental backup strategy, a backup application creates an initial snapshot that is a full snapshot and creates incremental snapshots thereafter.

Data management/protection strategies increasingly rely on cloud service providers. A cloud service provider maintains equipment and software without burdening customers with the details. The cloud service provider provides an application programming interface (API) to customers. The API provides access to resources of the cloud service provider without visibility of those resources.

BRIEF DESCRIPTION OF THE DRAWINGS

Aspects of the disclosure may be better understood by referencing the accompanying drawings.

FIG. 1 is a diagram of an example storage appliance that restores a directory with named data blocks. FIG. 2 is a diagram of snapshot metadata in key-value stores maintained at the storage appliance 105.

DESCRIPTION

Figure 1:
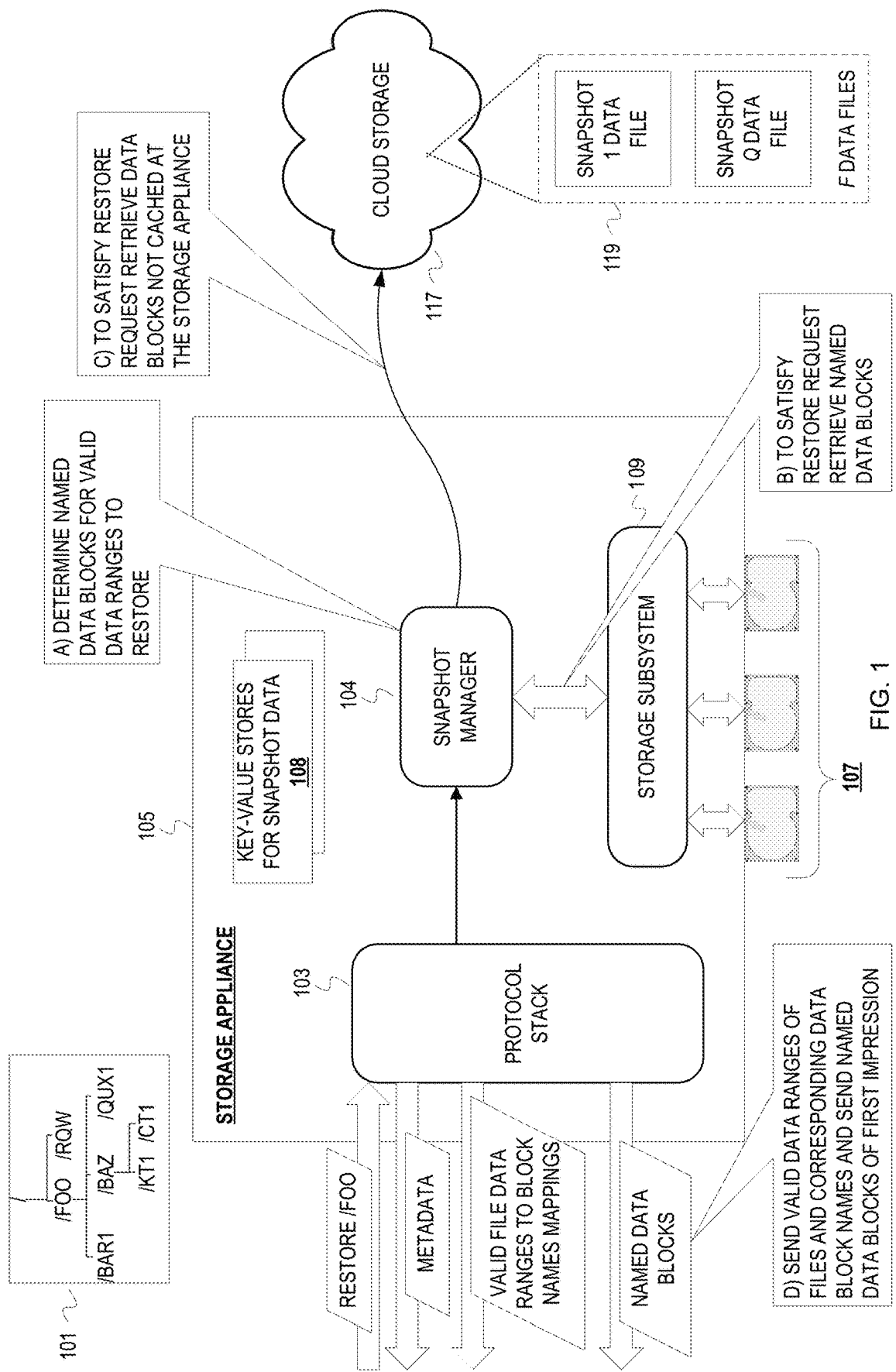
FIGS. 1 and 2 are described together to illustrate an example directory restore.

The description that follows includes example systems, methods, techniques, and program flows that embody embodiments of the disclosure. However, it is understood that this disclosure may be practiced without these specific details. For instance, this disclosure refers to data blocks in illustrative examples. However, units of data can be shared across files/objects at a different granularity or have different monikers (e.g., data segments, data extents, etc.). In other instances, well-known instruction instances, protocols, structures and techniques have not been shown in detail in order not to obfuscate the description.

Introduction

A data management/protection strategy is carried out by a "solution" that includes one or more applications, which will be referred to herein as a data management application. The data management application can run on a storage operating system (OS) that is installed on a device (virtual or physical) that operates as an intermediary between a data source(s) and cloud storage. A data management application that uses snapshots effectively has 2 phases: 1) creation of snapshots over time, and 2) restoring/activating a snapshot(s).

The data management application creates a snapshot by copying data from a data source, which may be a primary or secondary storage (e.g., backup servers), to a storage destination. This storage destination can be a storage appliance between the data source and private or public cloud storage (i.e., storage hosted and/or managed by a cloud service provider). "Storage appliance" refers to a computing machine, physical or virtual, that provides access to data and/or manages data without requiring an application context. Managing the data can include securing the data, deduplicating data, managing snapshots, enforcing service level agreements, etc. The storage appliance is the destination for the snapshots from the perspective of the data source, but operates as a cache for snapshots to be ultimately stored in cloud storage. A snapshot that has not been evicted from the storage appliance can be expeditiously restored from the storage appliance. The storage appliance can also efficiently respond to at least metadata related requests because the storage appliance maintains metadata for snapshots, both cached and evicted snapshots. The efficient operation of the storage appliance can help ensure compliance with a customer's recovery time objective (RTO) while the storage appliance also fulfills data retention demands of a customer by archiving snapshots in the cloud storage. The storage appliance satisfies the different data management goals of disaster recovery and data retention.

Overview

A storage appliance can be designed to facilitate efficient restore of multiple backed up files, such as an efficient restore of a snapshot of a directory, in a system that allows files to share data blocks (e.g., a deduplicating storage system). A data management application or storage OS names data blocks and communicates those names to the storage appliance when backing up to or through the storage appliance. The storage appliance can leverage the data block names when restoring a group of files by restoring at data block granularity instead of file granularity. Restoring at the granularity of the data blocks by their names allows the storage appliance to avoid repeatedly sending a same data block to the restore requestor (e.g., a storage OS or data management application) while still instructing the restore requestor how to reconstruct the corresponding file(s) with mappings between valid data ranges and the named data blocks. Avoiding repeatedly sending the same data block shared across multiple files not only reduces memory consumption but also reduces bandwidth consumption between the storage appliance and the data management application, and possibly between the storage appliance and the cloud storage. In addition, the storage appliance can build a list of names of the data block to be restored and then retrieve those data blocks in accordance with an order defined by the data block names. This allows for efficient retrieval of the data blocks from a sequential storage media (e.g., disks) because the order of names likely corresponds to the order in which the data blocks were written to the storage media. Thus, fewer reads can retrieve one or more groups of data blocks for the restore.

Example Illustrations

Figure 2:
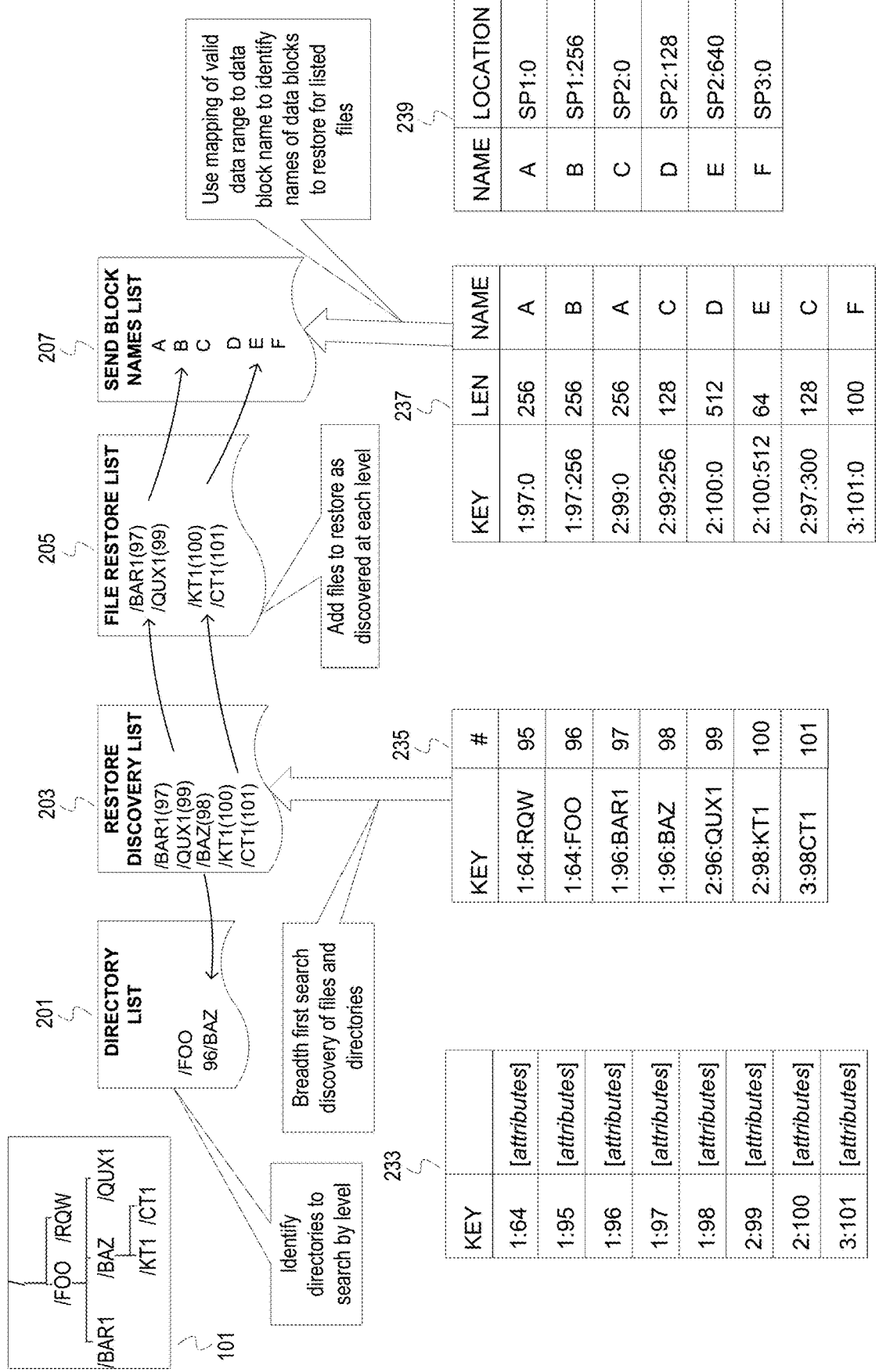

FIGS. 1 and 2 are described together to illustrate an example directory restore. FIG. 1 is a diagram of an example storage appliance that restores a directory with named data blocks. FIG. 1 is described with reference to FIG. 2 which depicts example data stores and data structures maintained by the storage appliance for the directory restore.

FIG. 1 depicts a storage appliance 105 that includes or is communicatively coupled with an array of storage devices 107 (e.g., a disk array, a flash storage bank, a hybrid storage array, etc.). The storage appliance 105 can use some or all of the storage device array 107 to cache data from a data source that is eventually evicted to a cloud storage 117. The storage appliance 105 includes a protocol stack 103 and a snapshot manager 104.

The protocol stack 103 is a stack of software that, in this illustration, processes data of snapshots for defined data collections. A defined data collection is an identifiable collection of data that can be a volume, partition, virtual disk, file system instance, etc. The protocol stack 103 performs communication/network protocol processing, and possible additional protocol processing to extract snapshot components from the received snapshot data. A snapshot component can be a message, object, operation, etc., that indicates whether the information in the snapshot relates to data or metadata, a directory change, an inode metadata change, etc. The protocol stack 103 extracts and formats the snapshot components for processing by the snapshot manager 104. The protocol stack 103 performs handshaking operations with a data source to exchange information about a defined data collection and snapshots available at the storage appliance 105 for the defined data collection.

The snapshot manager 104 arranges snapshot metadata and snapshot data received from the protocol stack 103. The snapshot manager 104 arranges the snapshot metadata into an appropriate one of the key-value stores 108 maintained by the snapshot manager 104. Examples of the snapshot metadata include inode attributes, directory information, and location information of data blocks within snapshot data files. The snapshot manager 104 maintains snapshot data files 119 by snapshot and by defined data collection. The snapshot manager 104 can arrange the snapshot data files by deriving a file naming scheme for each snapshot data file that is based on locally generated snapshot identifiers. The snapshot manager 104 stores the snapshot data files in the storage device array 107, and then migrates the snapshot data files to the cloud storage 117. Migrating the data to cloud storage 117 can include one or more data management/efficiency operations, such as deduplication, compression, and/or encryption. The storage appliance 105, however, maintains the snapshot metadata and copies the snapshot metadata to the cloud storage 117. The storage appliance 105 can copy the metadata to the cloud storage 117, but can also apply data management/efficiency operations to the metadata and write the modified metadata to the cloud storage 117.

FIG. 1 is annotated with a series of letters A-D that represents stages of one or more operations per stage. This disclosure is not necessarily limited to the depicted order of the stages and subject matter falling within the scope of the claims can vary with respect to the order to some extent.

A data management application or storage OS communicates a request to restore a directory /FOO of a filesystem at a data source. A partial directory structure 101 indicates the directory /FOO as a child of the root directory. The root directory has another child directory /RQW. The directory /FOO contains a subdirectory or child directory /BAZ and 2 files BAR1 and QUX1. The child directory /BAZ includes 2 files: KT1 and CT1. This is a state of the filesystem of the data source corresponding to the restore request. And the filesystem has been previously backed up to the cloud storage 117 via the storage appliance 105. For instance, the state of /FOO as depicted in the structure 101 corresponds to a snapshot N requested for restore and snapshots 1-N have previously been sent to the storage appliance 105. The protocol stack 103 processes the request and passes it to the snapshot manager 104.

Based on receipt of the restore request, the snapshot manager 104 determines named data blocks for valid data ranges of files to restore at stage A. Prior to or concurrent with determining the named data blocks, the snapshot manager 104 can return to the requestor filesystem metadata corresponding to /FOO. The snapshot manager 104 uses the key-value stores 108 to determine the named data blocks of the files to restore within the directory /FOO. FIG. 2 is referenced to describe the snapshot manager 104 using the key-value stores 108 and various other data structures to determine the named data blocks to restore. FIG. 2 includes the partial structure 101 for ease of reference to understand the hierarchical relationship among the filesystem objects (i.e., files and directories).

FIG. 2 is a diagram of snapshot metadata in key-value stores maintained at the storage appliance 105. When the storage appliance 105 receives a snapshot, the storage appliance 105 inserts snapshot metadata records into the appropriate key-value store and writes corresponding data blocks into snapshot data files. The storage appliance 105 can handle multiple data collections, but illustration of a single data collection is sufficient for explaining the efficient bulk restore. Considering a single set of key-value stores for a single defined data collection, the storage appliance 105 generates a local identifier for each of the snapshots of a data collection. The local snapshot identifiers identify snapshots while also implicitly indicating order of the snapshots. Source snapshot identifiers (i.e., snapshot identifiers generated at the snapshot source), such as universally unique identifiers (UUIDs), are not necessarily deterministic and, thus, may not imply order of the snapshots. The storage appliance binds a source snapshot identifier to a local snapshot identifier. This binding allows the storage appliance to resolve the identifiers in both directions: from source snapshot identifier to local snapshot identifier to access snapshot metadata in the key-value stores and from local snapshot identifier to source snapshot identifier to communicate with the data source about the snapshots.

The storage appliance 105 arranges the snapshot metadata into filesystem object attribute metadata 233 ("inode metadata" or "inode records"), parent-child metadata 235 ("directory records"), and data map metadata 237 ("data map records"). All of the snapshot metadata records illustrate use of local snapshot identifiers as key prefixes. The storage appliance 105 can use a monotonically increasing counter for each new snapshot. In this example, a baseline snapshot has a local identifier of "1" and subsequent incremental snapshot has a local snapshot identifier of "2." In this illustration, the different metadata arrangements are implemented in key-value stores.

Thus, the example data illustrates that three snapshots have been received for the defined data collection. The storage appliance 105 constructs a key for an inode record from a local snapshot identifier and an inode number. The values for an inode record are the filesystem object attributes (e.g., author, create time, last modified time, etc.) for the inode in the corresponding snapshot. The storage appliance 105 constructs a key for a directory record from a local snapshot identifier, a parent inode number, and a child name. The child name may be a name of a file or a directory. The value in a directory record is at least an inode number corresponding to the child name. The storage appliance 105 constructs a key for a data map record from a local snapshot identifier, an inode number, and a source file offset (i.e., offset of a containing file as communicated in the snapshot of the data source). The value in a data map record is at least a length of the data block and data block name. The location of the named data block is maintained in other metadata that indications locations of named data blocks in snapshot data files by offset within the snapshot data files. A snapshot data file is an aggregation of the named data blocks for files within a corresponding snapshot. The requestor (e.g., data management application or storage OS) that performs deduplication on the defined data collection (e.g., filesystem instance) generates identifiers or names for data blocks that can be shared across files and/or recur within a file. Naming of these data blocks can conform to a scheme that incorporates information in order for the generated names to at least imply an order. For example, the requestor may generate names based on a data block fingerprint and time of data block creation and assign the combination (e.g., concatenation) of the fingerprint and creation time as the name for the data block. As another example, the requestor may generate a name with a monotonically increasing identifier for each unique data block.

The simple example data of FIG. 2 is sufficient to conceptually describe an example bulk/directory restore with the metadata arrangement maintained at a storage appliance that operates as a cloud storage cache. Additional metadata can be maintained with the same paradigm of keys. For example, additional metadata can be maintained for access control lists and other granularities of data containers (e.g., logical unit number (LUN)).

Based on receipt of the restore request, the storage appliance 105 searches the key-value stores 235, 237 to discover files to be restored within /FOO and its subdirectories and to discover the named data blocks to return for valid data ranges. The storage appliance 105 searches the key-value store 235 to find the inode number of the directory to restore, which is /FOO. The storage appliance 105 will start with the known root inode number, which is 64 in this example. The storage appliance 105 can search the keys of the key-value store 235 for 64:FOO. The search results in determination of the inode number for /FOO, which is 96. With the inode number of the directory to restore, the storage appliance 105 can conduct a breadth first search of the key-value store 235 to find the files and directories within /FOO level by level. As the storage appliance 105 discovers file system objects in the key-value store 235 with a key that includes 96 (i.e., the inode number of FOO), the storage appliance adds the name of the filesystem objects and/or inode numbers of the filesystem objects to a restore discovery list 203. The restore discovery list 203 tracks the filesystem objects that have been discovered at a current level of the directory to be restored. After the storage appliance 105 discovers the filesystem objects across snapshots at a current level being searched within /FOO, the storage appliance 105 moves the identifiers of files to restore from the list 203 to a file restore list 205. The snapshots spanned in the search do not include snapshots beyond the snapshot specified for restore. For instance, the storage appliance would not search records in the key-value store 235 with a key prefix greater than 2 if the specified snapshot for restore is 2. Thus, the storage appliance 105 would not discover the file CT1. The file restore list 205 tracks the files to be restored. In this illustration, the storage appliance 105 discovers files BAR1 and QUX1 at a first level of /FOO and later discovers files KT1 and CT1 within the subdirectory /BAZ. The storage appliance 105 moves identifiers of discovered directories to a directory list 201. The directory list 201 tracks directories to search for files to restore. Since the key-value stores use the inode numbers within the keys, the storage appliance tracks the filesystem objects by their inode numbers, although the names can be tracked as well.

At some point, the storage appliance 105 determines the valid ranges of the files in the file restore list 205 and corresponding data block names. This point can be after discovery completes for each level, after n files are listed, or after discovery of filesystem objects completes. To determine the valid data ranges and corresponding data block names, the storage appliance 105 searches the key-value store 237 for each file listed in the list 205 from the specified snapshot back to a baseline snapshot. Assuming snapshot 3 was specified for restore, the storage appliance 105 would initially search the key-value store 237 for a key that includes each of the inode numbers of the files listed in the list 205, but with a key prefix equal to 3. The storage appliance 105 then walks backwards through the snapshots to identify the valid data ranges of the files to restore. In this illustration, the storage appliance 105 determines a valid range for the file CT1 in snapshot 3 with a length of 100 and source offset of 0. The storage appliance 105 also determines that this valid data range corresponds to a data block named "F." The storage appliance 105 then searches through the data map records of snapshot 2 for the listed files for restore, and determines valid ranges based on overlap among ranges of different snapshots with the more recent ranges controlling validity. Thus, data ranges or portions of data ranges in older snapshots are disregarded as having been overwritten. The storage appliance 105 determines that the file QUX1 has a valid data range from source offset 0 for a length of 256 bytes, which maps to a data block named A. The file QUX1 also has a valid data range in snapshot 2 from source offset 256 for a length of 128 bytes, which maps to a data block named C. The storage appliance 105 also determines valid data ranges in snapshot 2 for the file KT1 as the range 0:512 and 512:64 (formatted as <source offset>:<length>). The valid data range for KT1 0:512 maps to a named data block D and the valid data range 512:64 maps to named data block E. The storage appliance 105 also determines from the snapshot 2 information a valid data range 300:128 for the file BAR1. The storage appliance then starts searching the snapshot 1 entries in the key-value store 237 for keys that include the inode numbers for the files to restore. The storage appliance 105 finds data ranges for the file BAR1 that include 0:256 and 256:256. The data range 0:256 of BAR1 maps to the named data block A and the data range 256:256 of BAR1 maps to the named data block B. However, part of the data range for BAR1 256:256 has been overwritten in snapshot 3. Therefore, the storage appliance 105 determines that the data range 0:256 is valid. For the data range 256:256, the storage appliance 105 removes the overlapping portion and determines the valid data range to be 256:4. The below table 1 indicates the valid data ranges determined for the files to be restored and the corresponding named data blocks.

TABLE 1

Valid Data Ranges and Corresponding Data Block Names

| Filename (inode) | Valid Data Range(s) | Data Block Name |
|---|---|---|
| BAR1 | 0:256; 256:4; 300:128 | A; B; C |
| QUX1 | 0:256; 256:128 | A; C |
| KT1 | 0:512; 512:64 | D; E |
| CT1 | 0:100 | F |

Returning to FIG. 1, the storage appliance 105 then begins retrieving the named data blocks corresponding to the valid data ranges of the files to restore to fulfill the directory restore request. Although this illustration depicts the determination of named data blocks for valid data ranges and data block retrieval as discrete, embodiments can begin retrieving data blocks as soon as one is determined for a valid data range. At stage B, the storage appliance 105 first accesses local memory and/or storage via a storage subsystem 109 to retrieve any of the named data blocks that may be cached at the storage appliance 105. When retrieving, the storage appliance may be able to efficiently read the data blocks from a storage media to which the data blocks were written sequentially. The naming of the data blocks will likely correspond to order that the data blocks were written to the storage media of the storage appliance 105, assuming a sequentially written storage media (e.g., disk). For instance, the storage appliance 105 may be able to read blocks A-C with a single read operation. At stage C, the storage appliance retrieves from the cloud storage 117 the named data block of the valid data ranges that were not cached at the storage appliance 105.

To determine locations of the named data blocks, the storage appliance 105 accesses a named data block map 239 depicted in FIG. 2. The named data block map 239 indicates location of a named data block within a snapshot data file. Although embodiments could repeatedly store named data blocks in different snapshot files when the named data block recurs in different snapshots, the illustrated example does not. As illustrated in FIG. 2, the named data blocks A and B are respectively at offsets 0 and 256 of the snapshot data file SP1. Instead of repeating the data block in the snapshot data file SP2 (which corresponds to snapshot 2), restoring the file QUX1 will rely on the named data block A that is in the SP1 data file. The named data blocks C, D, E are respectively at offsets 0, 128, and 640 in the snapshot data file SP2. Finally, the named data block F is at offset 0 of the snapshot data file SP3.

At stage D, the storage appliance 105 communicates the determined valid file data ranges and corresponding data blocks names and data blocks of first impression for the restore. As with the retrieval, the storage appliance 105 does not necessarily wait until it has determined all of the information. The storage appliance 105 can begin communicating valid data ranges at various points in time (e.g., as each file is finished across snapshots, after n files, after all valid data ranges for files in a sub-directory have been determined, etc.). Although the storage appliance 105, communicates back to the restore requestor the valid data ranges for all of the discovered files and mappings to data block names, the storage appliance 105 does not communicate back data blocks already sent. The storage appliance 105 tracks which blocks have been sent. If a block has already been sent, then the storage appliance 105 communicates the valid data range mapping to data block name and allows the requestor to use the previously sent data block to restore. Referring to Table 1, the storage appliance 105 will communicate back to the requestor the filenames and/or identifiers with the valid data ranges in table 1. However, the storage appliance 105 will not communicate back the data block A and C twice.

Figure 3:
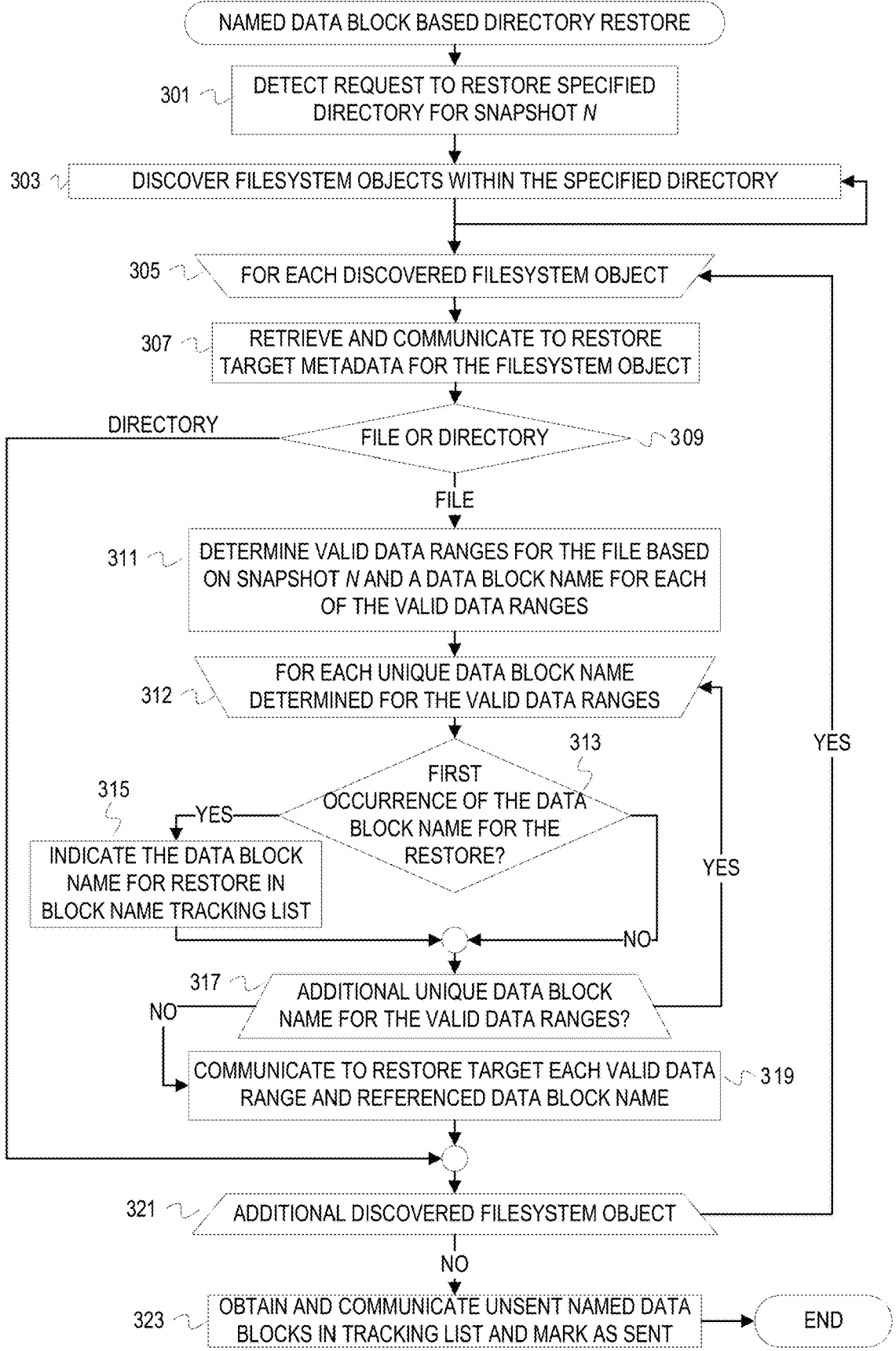
FIG. 3 depicts flowchart of example operations for efficient multi-file restore with named data blocks.

FIG. 3 depicts flowchart of example operations for efficient multi-file restore with named data blocks. The example operations include the aspects of providing filesystem metadata to a restore target and discovery of valid data ranges for the files to be restored according to a restore request. In particular, data block names are determined for the valid data ranges to conserve resources when both retrieving the named data blocks and communicating the named data blocks to the restore target for an efficient retrieval. The FIG. 3 description refers to a storage appliance performing the operations for consistency with FIG. 1 and not to limit implementation of the subject matter.

At block 301, a storage appliance detects a request to restore a specified directory for a snapshot N. The request may indicate a path of the directory to restore and/or an inode number of the directory to restore. The storage appliance receives the request from an instance of a storage OS or data management application (e.g., backup application) running on another machine (physical or virtual) than the storage appliance. Although the requestor can be the target of the restore, the restore request can indicate a restore target other than the requestor, for example by network address or device name.

At block 303, the storage appliance begins discovery of filesystem objects within the specified directory. The storage appliance can search directory records, regardless of the specific arrangement of the records (e.g., key-value store, database, tree data structure, etc.), to discover the files and directories within the specified directory. For example, the storage appliance can perform a search of an arrangement of directory records or entries based on the breadth first search (BFS) algorithm. This would discover the filesystem objects at each level within the specified directory. Implementations can search based on other techniques, such as the depth first search algorithm. The searching implementation can vary depending upon how the information can be accessed most efficiently. The storage appliance continues to block 305 while also continuing the search until completion. Referring again to a BFS based implementation, the storage appliance can use a first thread or process to discover the file system objects at a first level beneath the specified directory and then can launch one or more other threads or processes to perform the other operations of collecting and communicating the information of the discovered filesystem objects discovered at the level(s) for which discovery has completed. Concurrently, the first thread/process can continue with discovery.

At block 305, the storage appliance begins a loop of operations for obtaining and communicating information to the restore target about the discovered filesystem objects, including data block names. The information includes the metadata for the filesystem objects, valid data ranges, data block names, and data blocks of first impression for the restore.

At block 307, the storage appliance retrieves and communicates to the restore target metadata for the discovered filesystem object. Using the illustration of FIG. 2, the storage appliance looks up the metadata in the key-value store 233 for the discovered filesystem object based on the snapshot to be restored. The storage appliance can communicate the retrieved metadata to the restore target for each discovered filesystem object or group together into fewer communications.

At block 309, the storage appliance determines whether the filesystem object is a directory or a file based on the retrieved metadata. If the filesystem object is a directory, then the storage appliance determines whether there is another discovered filesystem object at block 321. If the discovered filesystem object is a file, then the storage appliance proceeds to block 311.

At block 311, the storage appliance determines the valid data ranges for the file based on snapshot N and determines a data block name corresponding to each of the valid data ranges. The storage appliance begins searching through the data range records of the file from the specified snapshot N back to a preceding baseline snapshot or synthetic baseline snapshot. The storage appliance accumulates distinct ranges and each reference/mapping to a data block name. As part of determining validity, data ranges from older snapshot may be disregarded, truncated, or split based on overlap with data ranges of more current snapshots. In addition, the storage appliance tracks the corresponding data block name of each valid data range. For some data ranges, the valid portion of the data range will be less than the entire named data block referenced by the data range in the data map entry/record. The mapping will still be communicated to the restore target and the restore target and determine the portion of the named data block. This allows the restore target to use the named data block across multiple valid data ranges and/or files despite the different portion of the named data block being valid for the different ranges/or files.

At block 312, the storage appliance begins a loop of operations for unique ones of the data block names determined for the valid data ranges of the file. This loop of operations is to disregard repeat references to same data blocks within a file. Each valid data range is referred to as the selected valid data range for ease of explanation.

At block 313, the storage appliance determines whether the selected valid data range of the discovered file references a data block name of first impression or first occurrence for this restore. While determining the valid data ranges (311), the storage appliance tracks the block names referenced by each of the valid data ranges as it iterates over the data map entries in reverse snapshot order. The storage appliance can maintain a list of data block names as encountered, compare the data block name mapped to the selected valid data range against the tracking list of data block names to determine whether it is the first occurrence. For instance, the selected valid data range may reference data block named "B." The data block "B" would not be a name of first impression of a previously processed file also referenced the data block "B" resulting in the data block name being added to the list. If it is a first occurrence or first impression of the data block name for this restore, then control flows to block 315. Otherwise, control flows to block 317.

At block 315, the storage appliance indicates the data block name for restore in the tracking list of data block names. The data structure for implementation of the list can include an entry for each data block name of first impression for this restore and a field for marking or setting a flag that indicates whether the named data block has been sent to the restore target. Control flows from block 315 to block 317.

At block 317, the storage appliance determines whether there are any additional unique data block names references by the valid data ranges of the discovered file. If there is an additional referenced data block name that is unique for the file, then control flows back to block 312. Otherwise, control flows to block 319.

At block 319, the storage appliance communicates to the restore target each valid data range of the file and the data block name(s) referenced by the valid data range(s). Regardless of repetition, the storage appliance communicates to the restore target each valid data range and the data block name referenced by the valid data range. This allows the restore target to reconstruct the file, whether the named data block has already been sent or will be sent.

At block 321, the storage appliance determines whether there is an additional discovered filesystem object. As previously mentioned, a discovery thread/process can search through the backup/snapshot metadata maintained by the storage appliance to discover files and directories while another thread(s)/process(es) determines the valid data ranges of the discovered files and communicates with the restore target. If there is an additional discovered filesystem object, control flows back to block 305. Otherwise, control flows to block 323.

At block 323, the storage appliance obtains and communicates the named data blocks in the data block name tracking list that have not already been sent. The storage appliance retrieves the named data blocks cached by the storage appliance. The storage appliance then retrieves those named data blocks not cached at the storage appliance from cloud storage. The storage appliance maintains information to indicate whether a named data block has already been sent to the restore target, such as a flag or bit in the data block name list. Since a data block name only occur once in the listing, the storage appliance can fulfill the restore request with a single retrieval and communication of the named data blocks. The storage appliance may sort the data block names according to order represented by the data block names prior to obtaining the data blocks. This can result in additional efficiency since the data block names can correspond to order that the data blocks were written to storage media. This can be because the data source communicates the data blocks and names thereof to the storage appliance according to the order as represented by the data blocks names. Embodiments may also write the data blocks to data files according to order of the data block names. For instance, a storage appliance can receive data blocks A, C, D, B, F, E. The storage appliance can then write the data blocks in the sequence A, B, C, D, E, F into a snapshot 1 file, assuming the names at least imply an order if not explicitly indicate an order of generation of the data blocks at the data source. For a second snapshot, the data source can communicate data blocks G, B, M. The storage appliance writes to a second snapshot data file the data blocks in the sequence G and M.

Variations

The above example illustrations presume a single restore target. However, a request can indicate multiple restore targets. A storage appliance would perform the file system object discovery and named data block based retrieval for each restore target. In some cases, metadata can be restored to a first target (e.g., a metadata server) and data blocks along with mappings of valid data ranges and data block names can be restored to one or more other targets.

The above example illustrations also refer to restore of a directory. However, embodiments can fulfill a request to restore multiple files in different forms. For example, a restore request can request restore of discretely listed files, multiple directories, a mixture of files and directories, etc.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the example operations depicted in FIG. 3 communicate filesystem object metadata and valid data ranges for each file while waiting to send named data blocks until all filesystem objects have been discovered and valid data ranges determined. Embodiments can carry out these operations at different intervals and/or based on different thresholds. For instance, embodiments can obtain and communicate named data blocks after a threshold number of files have been discovered or after determined valid data ranges satisfy a threshold size. Embodiments can use a single threshold or multiple thresholds, and they can be dynamic. For instance, embodiments can set different thresholds based on a number of directories being requested for restore. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 4:
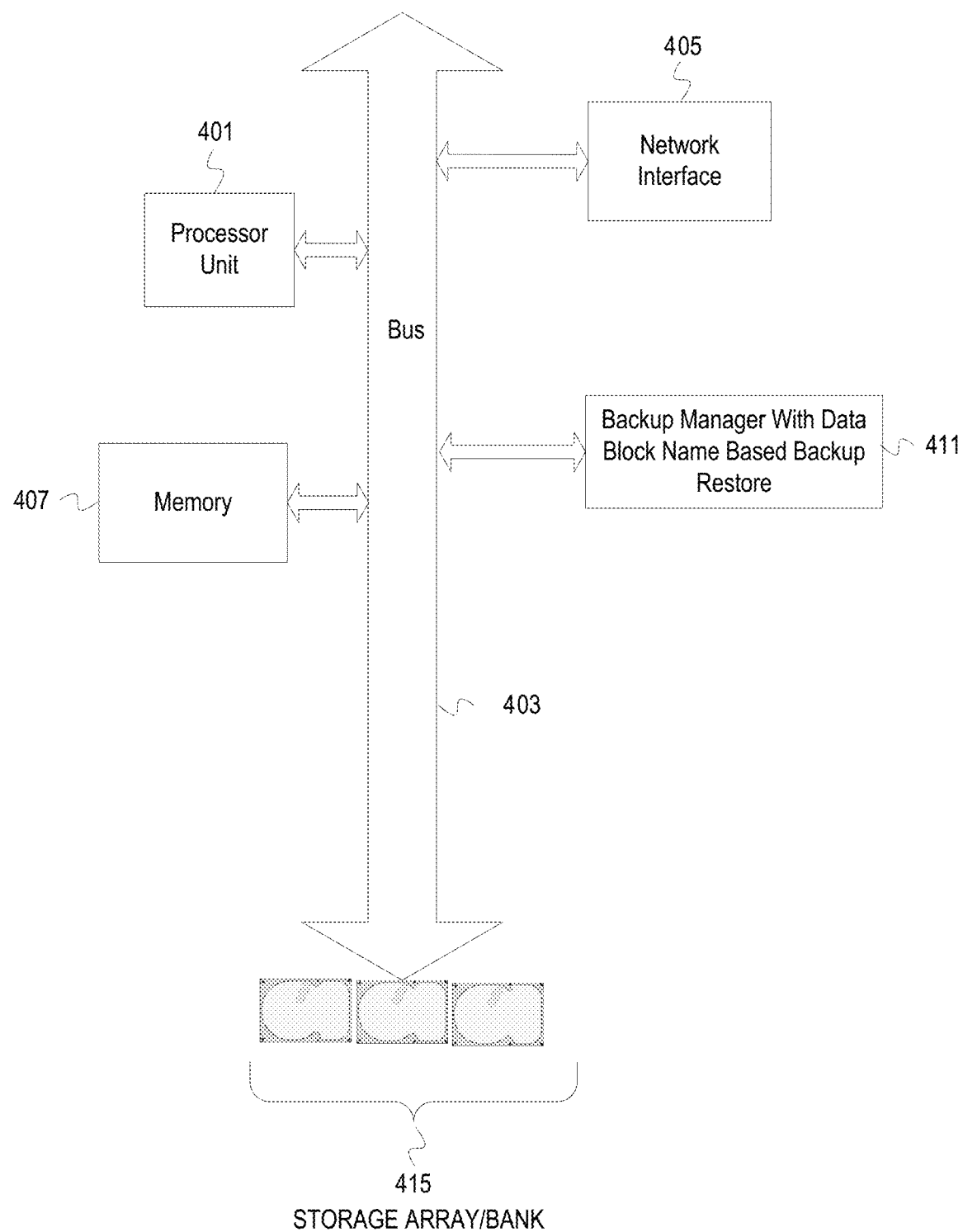
FIG. 4 depicts an example computer system with a backup manager with data block name based backup restore.

FIG. 4 depicts an example computer system with a backup manager with data block name based backup restore. The computer system includes a processor 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport® bus, InfiniBand® bus, NuBus, etc.) and a network interface 405 (e.g., a Fiber Channel interface, an Ethernet interface, an internet small computer system interface, SONET interface, wireless interface, etc.). The system also includes a backup manager 411. The backup manager 411 includes functionality to efficiently restore a backup (e.g., snapshot) based on data block names in a storage system that allows for files to share data blocks (e.g., due to deduplication). The backup manager 411 determines files to restore based on a restore request and corresponding filesystem metadata. The backup manager 411 then determines unique data block names references by valid data ranges of the files to restore, and limits retrieval and communication to single instances of the named data blocks. The backup manager 411 can first retrieve the named data blocks from a storage array or storage bank 415 (e.g., disk array, flash storage bank, hybrid storage, etc.) used by backup manager 411 as a cache before the data is migrated to a cloud storage. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

While the aspects of the disclosure are described with reference to various implementations and exploitations, it will be understood that these aspects are illustrative and that the scope of the claims is not limited to them. In general, techniques for efficient restore of backup data in a distributed storage system that performs deduplication as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   determining, by a computing device, one or more valid data ranges for each of a plurality of files and a data block name for each of the valid data ranges, wherein the files are in one or more directories of a backup instance identified in a received restore request;

tracking, by the computing device, a unique instance of each of the data block names comprising adding a first one of the data block names to a tracking list of data block names when the first one of the data block names is determined to be a first occurrence during a restore that is responsive to the restore request, wherein a second one of the data block names corresponds to one of the valid data ranges comprising a least a portion that is shared by two or more of the files; and
   communicating, by the computing device and in response to the restore request, retrieved data blocks assigned to the tracked unique instances of each of the data block names.

2. The method of claim 1, further comprising determining, by the computing device, overlapping ones of the valid data ranges in reverse time order from the backup instance.

3. The method of claim 2, wherein the backup instance corresponds to one of a plurality of snapshot identifiers in the restore request and the snapshot identifiers represent a temporal order of snapshots.

4. The method of claim 1, further comprising retrieving, by the computing device, a set of the data blocks from a local cache in an order based, at least in part, on a corresponding set of the data block names.

5. The method of claim 1, further comprising writing, by the computing device, the retrieved data blocks to a storage media in an order based on corresponding ones of the data block names to create the backup instance prior to migrating at least part of the backup instance to a cloud storage.

6. A non-transitory machine-readable medium having stored thereon instructions for data block name based restore of multiple files in a snapshot comprising machine executable code which when executed by at least one machine, causes the machine to:
   determine one or more valid data ranges for each of a plurality of files and a data block name for each of the valid data ranges, wherein the files are in one or more directories of a backup instance identified in a received restore request;
   track a unique instance of each of the data block names comprising adding a first one of the data block names to a tracking list of data block names when the first one of the data block names is determined to be a first occurrence during a restore that is responsive to the restore request, wherein a second one of the data block names corresponds to one of the valid data ranges comprising a least a portion that is shared by two or more of the files; and
   communicate, in response to the restore request, retrieved data blocks assigned to the tracked unique instances of each of the data block names.

7. The non-transitory machine-readable medium of claim 6, wherein the machine executable code when executed by the machine, further causes the machine to determine overlapping ones of the valid data ranges in reverse time order from the backup instance.

8. The non-transitory machine-readable media medium of claim 7, wherein the backup instance corresponds to one of a plurality of snapshot identifiers in the restore request and the snapshot identifiers represent a temporal order of snapshots.

9. The non-transitory machine-readable media medium of claim 6, wherein the machine executable code when executed by the machine, further causes the machine to retrieve a set of the data blocks from a local cache in an order based, at least in part, on a corresponding set of the data block names.

10. A computing device comprising:
a memory containing a machine readable medium comprising machine executable code having stored thereon instructions for data block name based restore of multiple files in a snapshot; and
a processor coupled to the memory, the processor configured to execute the machine executable code to cause the processor to:
determine one or more valid data ranges for each of a plurality of files and a data block name for each of the valid data ranges, wherein the files are in one or more directories of a backup instance identified in a received restore request;
track a unique instance of each of the data block names comprising adding a first one of the data block names to a tracking list of data block names when the first one of the data block names is determined to be a first occurrence during a restore that is responsive to the restore request, wherein a second one of the data block names corresponds to one of the valid data ranges comprising a least a portion that is shared by two or more of the files; and
communicate, in response to the restore request, retrieved data blocks assigned to the tracked unique instances of each of the data block names.

11. The computing device of claim 10, wherein the processor is further configured to execute the machine executable code to cause the processor to determine overlapping ones of the valid data ranges file in reverse time order from the backup instance.

12. The computing device of claim 11, wherein the backup instance corresponds to one of a plurality of snapshot identifiers in the restore request and the snapshot identifiers represent a temporal order of snapshots.

13. The computing device of claim 10, wherein the processor is further configured to execute the machine executable code to cause the processor to retrieve a set of the data blocks from a local cache in an order based, at least in part, on a corresponding set of the data block names.

14. The computing device of claim 10, wherein the processor is further configured to execute the machine executable code to cause the processor to write the retrieved data blocks to a storage media in an order based on corresponding ones of the data block names assigned to the data blocks to create the backup instance prior to migrating at least part of the backup instance to a cloud storage.

15. The non-transitory machine-readable medium of claim 6, wherein the machine executable code when executed by the machine, further causes the machine to write the retrieved data blocks to a storage media in an order based on corresponding ones of the data block names to create the backup instance prior to migrating at least part of the backup instance to a cloud storage.

16. The method of claim 1, further comprising comparing, by the computing device, the first one of the data block names to the tracking list of data block names to determine when the first one of the data blocks names is a first occurrence during the restore that is responsive to the restore request.

17. The non-transitory machine-readable medium of claim 6, wherein the machine executable code when executed by the machine, further causes the machine to compare the first one of the data block names to the tracking list of data block names to determine when the first one of the data blocks names is a first occurrence during the restore that is responsive to the restore request.

18. The computing device of claim 10, wherein the processor is further configured to execute the machine executable code to cause the processor to compare the first one of the data block names to the tracking list of data block names to determine when the first one of the data blocks names is a first occurrence during the restore that is responsive to the restore request.

* * * * *